Dec. 29, 1959 R. E. BLATT 2,918,750
CANDLE
Filed May 12, 1958

INVENTOR
RALPH E. BLATT

BY Cushman, Darby & Cushman
ATTORNEYS

United States Patent Office 2,918,750
Patented Dec. 29, 1959

2,918,750
CANDLE

Ralph E. Blatt, El Monte, Calif., assignor to Kenco Chemical Company, San Francisco, Calif.

Application May 12, 1958, Serial No. 734,486

7 Claims. (Cl. 43—125)

This invention relates to insect repellent candles.

It is highly desirable to prepare an insect repellent candle which is non-injurious to humans and warm blooded domesticated animals. Numerous attempts have been made to prepare non-toxic insect repellent candles which can be handled safely and without injury to babies and children, but the results have not been completely successful.

Accordingly, it is an object of the present invention to prepare a non-toxic insect repellent candle.

Another object is to prepare a candle which will burn to leave an exterior shell surrounding a hollow core.

A further object is to provide a decorative insect repellent candle which can be handled safely without injury to babies and children.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found, after much research work, that these objects can be attained by providing a wax candle with two external coating layers, one of said coating layers comprising a mixture of piperonyl butoxide and pyrethrin and the other coating layer comprising a dialkyl carbate, preferably dimethyl carbate, the dimethyl ester of cis-bicyclo (2.2.1)-hepto-5-en-2,3-dicarboxylic acid. When it is desired to have the candle burn to form a hollow core surrounded by an exterior shell, there should be incorporated in one of the coating layers, preferably the inner coating layer, a higher fatty acid, i.e., a fatty acid having at least 8 carbon atoms, i.e., caprylic acid to cerotic acid. Preferably stearic acid is employed. There can be used pure or commercial stearic acid. Commercial stearic acid contains 45% palmitic acid, 50% stearic acid and 5% oleic acid.

The invention will be more clearly understood by reference to the accompanying drawings, wherein.

Figure 1:
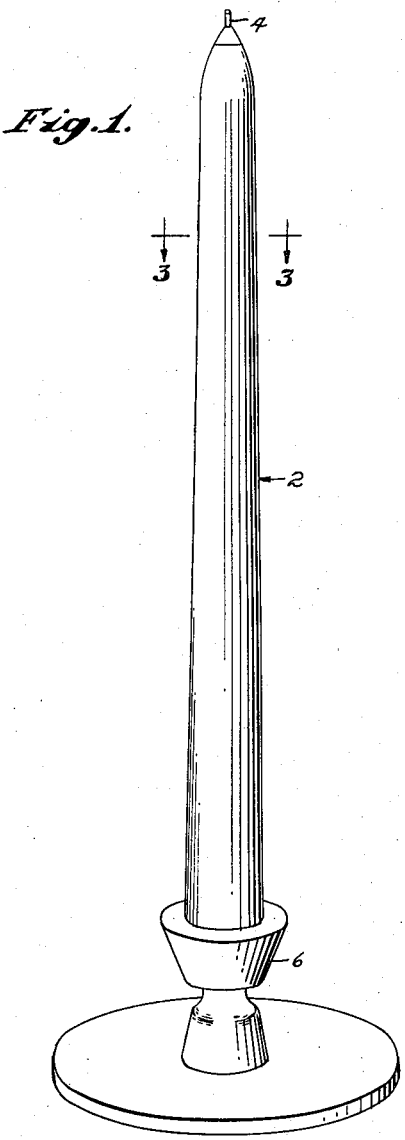
Figure 1 is a perspective view of the candle of the present invention prior to burning.
Figure 2:
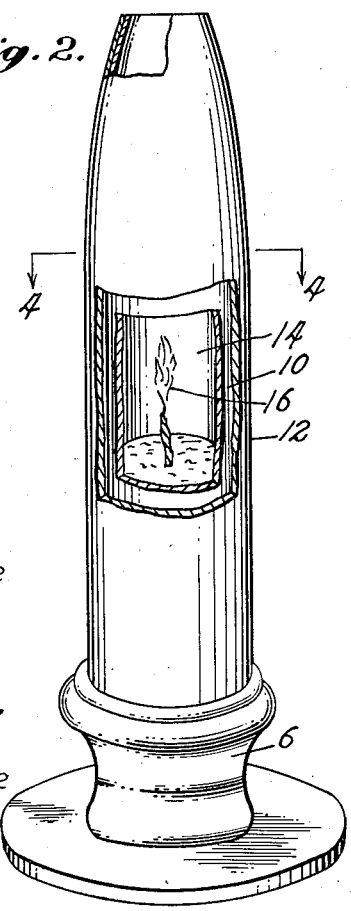
Figure 2 is a perspective view partially broken away in a section of a different candle in partially burned condition.
Figure 3:
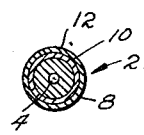
Figure 3 is a sectional view along the line 3—3 of Figure 1.
Figure 4:
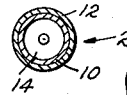
Figure 4 is a sectional view along the line 4—4 of Figure 2.

Referring more specifically to the drawings, there is provided a candle 2 (Figure 1) having a centrally disposed wick 4. As shown in Figures 1 and 2, the candle may be provided with a candlestick 6. The candle 2 comprises a conventional wax candle center portion 8 and a first coating 10 comprising wax, piperonyl butoxide, pyrethrins and stearic acid, as well as a second and outer coating 12 comprising wax and dimethyl carbate. As shown in Figure 2, there is provided a candle 20 which is lit and allowed to burn for a while. It will be observed that there is formed a hollow core 14 surrounded by coating layers 10 and 12, which coatings form a solid exterior. The flame 16 continues to burn since air has access thereto through the hollow core 14.

In a specific example, a conventional 3 inch diameter wax candle having a string type wick was employed. This candle was then dipped into a molten mixture of 87% paraffin wax, 10% stearic acid and 3% of Pyrenone O.F. (a mixture of 75% piperonyl butoxide, 7.5% pyrethrins and 17.5% inert material). The candle is dipped in this solution to form a ¼ inch thick first coating layer thereon. When the coated candle is fully cooled, it has no aromatic odor, but a light orange coloring. The coated candle is then dipped into a molten mixture of 50% paraffin wax and 50% dimethyl carbate to obtain a ½₂ inch thick exterior second coating layer thereon.

In the event that it is desired to make a candle which burns completely without leaving a shell surrounding the hollow core, then the 10% of stearic acid is omitted and the paraffin wax is increased to 97% in the first coating layer.

The size of the candle is not critical. Candles of from 2 inches up to 6 inches in diameter have been employed successfully, with 3 to 4 inch diameter candles being preferred.

The preferred wax for incorporation in the candle, as well as in the coating layers, is paraffin wax although there can be used Japan wax, artificial waxes and similar material. The cheapest non-smoking waxes are satisfactory. The first coating layer 10 usually contains 5 to 80%, preferably below 50%, of a higher fatty acid, e.g., stearic acid, 1 to 5% of a mixture of piperonyl butoxide and pyrethrins and the balance wax. In general, the softer the wax employed, the greater should be the percentage of higher fatty acid. The ratio of piperonyl butoxide to pyrethrins is not particularly critical and these two materials are normally employed in the ratios already known to be effective as insecticides.

It has been found highly desirable to take the wax and raise it to the melting point and just past the stage of cloudiness and then inject the Pyrenone O.F. insecticide and stearic acid into it. The candle is then either dipped in this solution or is mechanically coated. While preferably the coating is ¼ inch thick, this layer can be made thicker or thinner as desired.

The second coating layer 12 usually contains 20 to 50% of wax and the balance dimethyl carbate although these proportions can be varied. In order to apply this coating layer the candle is dipped three times, with intermediate drying, into the molten wax-dimethyl carbate mixture. The thickness of this second coating layer also is not critical, although desirably it is thinner than the first coating layer.

The final candle having the two coating layers has no aromatic odor and is non-toxic if eaten or touched, nor are toxic vapors given off while the candle burns.

The finished candle can be packed in tinfoil, aluminum or plastic, e.g., saran or polyethylene, or cellophane.

The effect of utilizing the combination of insecticides is that the flame induces a diffusion which is fatal to flying insects, e.g., flies, moths, gnats and similar insects within 3 to 5 feet of the circumference of the candle. It is essential to utilize both types of repellents in order to repel all types of insects. However, if both repellents are put together, decomposition results and, hence it is important that two separate coating layers be employed, The paraffin in the coating layers merely serves as a vehicle for the insecticides.

It is very important that the flame of the candle be far away from the coating layers to prevent the decomposition of the insecticidal chemicals on the shoulder, i.e., the coating layers. Hence, it is preferable to employ a small diameter wick, e.g., the wick of a church candle. While the preferred wick is string, there can be employed metal wicks.

While the candle is burning, it does not have enough warmth to melt the shoulder, particularly when a higher fatty acid is employed in layer 10, and, hence, it will stay intact and give the pleasant ornamental effect of a hollow candle, the light or flame of which is burning inside the candle.

While an essentially cylindrical candle is shown in the drawings, of course, other shaped candles can be employed, e.g., square, octahedron and triangular shaped candles can be utilized.

Unless otherwise stated, all parts and percentages are by weight.

What is claimed is:

1. A wax candle having two external coating layers, one of said coating layers comprising a mixture of piperonyl butoxide and pyrethrin and the other coating layer comprising a dialkyl ester of cis-bicyclo (2.2.1)-hepto-5-en-2,3-dicarboxylic acid.

2. A wax candle having two external coating layers, one of said coating layers comprising a mixture of piperonyl butoxide and pyrethrin and the other coating layer comprising the dimethyl ester of cis-bicyclo (2.2.1)-hepto-5-en-2,3-dicarboxylic acid.

3. A wax candle having a first coating layer comprising a mixture of piperonyl butoxide, pyrethrin and a higher fatty acid and a second coating layer surrounding said first coating layer and comprising the dimethyl ester of cis-bicyclo (2.2.1)-hepto-5-en-2,3-dicarboxylic acid.

4. A wax candle according to claim 3 wherein said higher fatty acid comprises stearic acid.

5. A wax candle having a hollow core, a solid exterior comprising wax, a higher fatty acid, piperonyl butoxide and pyrethrin and an external coating layer for said solid exterior comprising the dimethyl ester of cis-bicyclo (2.2.1)-hepto-5-en-2,3-dicarboxylic acid.

6. A method of preparing a coated candle comprising dipping a wax candle into a first mixture comprising molten wax, piperonyl butoxide and pyrethrin, allowing the molten mixture to cool and form an external coating on the candle and then dipping the coated candle into a second mixture comprising molten wax and the dimethyl ester of cis-bicyclo (2.2.1)-hepto-5-en-2,3-dicarboxylic acid.

7. A method according to claim 6 wherein said first mixture includes a higher fatty acid.

References Cited in the file of this patent

UNITED STATES PATENTS

| | | |
|---|---|---|
| 2,323,804 | Driscoll | July 6, 1943 |
| 2,504,211 | Means | Apr. 18, 1950 |